United States Patent [19]

Mizutani et al.

[11] Patent Number: 4,621,270

[45] Date of Patent: Nov. 4, 1986

[54] MULTI-COLOR PRINTER

[75] Inventors: Minoru Mizutani; Yoshihisa Fukurohata, both of Tokyo, Japan

[73] Assignee: Oki Electric Industry Co., Ltd., Tokyo, Japan

[21] Appl. No.: 758,271

[22] Filed: Jul. 24, 1985

[30] Foreign Application Priority Data

Jul. 30, 1984 [JP] Japan .................................. 59-157640

[51] Int. Cl.$^4$ .............................................. G01D 15/10

[52] U.S. Cl. ................................ 346/76 PH; 346/106; 400/120; 400/233

[58] Field of Search .................. 346/76 PH, 105, 106; 400/120, 207-208.1, 233; 219/216 PH

[56] References Cited

U.S. PATENT DOCUMENTS 4,437,778 3/1984 Miyashia et al. ............... 346/76 PH 4,507,668 3/1985 Horiya et al. ....................... 400/208

FOREIGN PATENT DOCUMENTS 0217384 12/1983 Japan ............................. 346/76 PH

*Primary Examiner*—A. Evans

*Attorney, Agent, or Firm*—Wenderoth, Lind & Ponack

[57] ABSTRACT

A heat transfer type multi-color printer which serves to automatically draw out a new ink ribbon with a simple constitution for recording. The multi-color printer includes members for holding/releasing an ink ribbon provided on a carriage which carries the recording head, and two ribbon spools of a ribbon cassette mounted on a printer body constructed to transmit unidirectional turning force of a spacing motor for moving the carriage. With this arrangement, the multi-color printer serves, when recording, to draw out the ink ribbon from one of the ribbon spools during the time the carriage moves in one direction and, serves, with the carriage moving in the opposite direction to hold the ink ribbon and to rotate the two ribbon spools for winding the ink ribbon.

9 Claims, 7 Drawing Figures

MULTI-COLOR PRINTER

BACKGROUND OF THE INVENTION

The present invention relates to an improved multi-color printer.

There are known various kinds of prior thermal transfer type multicolor printers.

One example in disclosed in Laid-Open Publication No. 57-99260 (Japanese Patent Publication No. 55-178143)

Described below with reference to drawings is the arrangement and operation of one example of such prior multicolor printers.

FIG. 1 is a schematic plan view illustrating an example of such types of multicolor printers. Designated at 1 is a platen 2. A recording head 2 such as a thermal head is carried on a carriage (not shown) movable along said platen 1. Designated at 3 is a sheet of recording paper. Designated at 4 is an ink ribbon, which serves to repetitively coat one surface of a continuous ribbon base material with heat meltable ink having a plurality of colors in the longitudinal direction of the base material successively, a prescribed length at each time. The ink ribbon is stretched between a supply reel 5 and a winding reel 6 in parallel to the platen 1. Rotations of the both reels 5, 6 by a motor (not illustrated) in the direction of arrows shown in the figure cause a portion already used of the ink ribbon 4 to be wound on the winding reel 6 while a portion not yet used is draw out from the supply reel 5.

Designated at 7 is a sensor means equipped with a filter for detecting a color of the ink of the ink ribbon 4.

The multicolor printer so constructed identifies a color of ink on the ink ribbon 4 drawn out by rotations of the supply reel 5 and the winding reel 6, positions the ribbon to bring about printing any ink having a color to be recorded, while pressing the recording head 2 onto the platen 1 by a means (not illustrated) via the ink ribbon 4 and the recording paper 3. With this arrangement, the recording head 2 transfers any amount of ink on the ink ribbon 4 onto the recording paper 3 for one color recording in response to a recording signal while moving a carriage for carrying the recording head 2 by a moving means (not illustrated). Likewise, other colors of ink are transferred in succession onto the recording paper 3 for color recording.

A multi-color printer of a type shown in FIG. 1, however, besides a sensor for positioning a portion of the ink ribbon of a color to be recorded to a recording position includes, a sensor for detecting an ink color as well as an exclusive motor for winding and drawing out an ink ribbon. Accordingly, the printer is expensive and complicated to be controlled.

SUMMARY OF THE INVENTION

It is an object of the present invention to provide an inexpensive multi-color printer controllable with ease.

Another object of the present invention is to provide a multi-color printer capable of winding and drawing out an ink ribbon and effecting required color recording without use of a sensor and a motor exclusively used for the ink ribbon.

Still another object of the present invention is to provide a multi-color printer capable of effectively employing an ink ribbon.

A multi-color printer according to the present invention has a carriage for carrying a recording head, including a ribbon clamping member, a ribbon clamping lever, and a spring for producing a clamping force, all mounted thereon. The printer is constructed such that a turning force of a spacing motor for moving the carriage is transmitted to two ribbon spools mounted on a printer body via a unidirectional rotation transmission means. In addition, an ink coating length for each color of an ink ribbon is made equal to the length of a carriage moving region from its initial position to its "turning-back position" (at which it is returned to the initial position).

Arranged as described above, a multi-color printer according to the present invention records any pieces of information by transferring onto a sheet of paper any amount of ink to be coated by a recording head while drawing out an ink ribbon from one ribbon spool upon moving a carriage to a turning-back position. In addition, movement of the carriage to said turning-back position causes a ribbon clamping lever to hold the ink ribbon in association with a ribbon clamping member. Thereafter, a unidirectional rotation transmission means forces, upon returning the carriage from the turning-back position to the original position, two ribbon spools to be rotated for winding the ink ribbon. Color recording can be effected by transferring a plurality of colors of ink onto a sheet of recording paper by repeating the operation described above. Further, in a case of recording with use of a single color ink ribbon, the device can be also employed without producing an unemployed portion on the ink ribbon since the ink ribbon can be held as described before between the ribbon clamping member and the ribbon clamping lever.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 2:
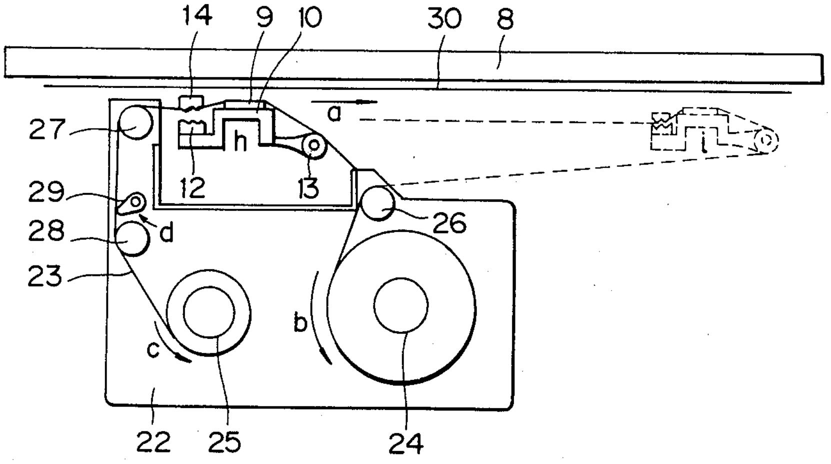
FIG. 2 is a plan view showing one embodiment of a multi-color printer according to the present invention.
Figure 3:
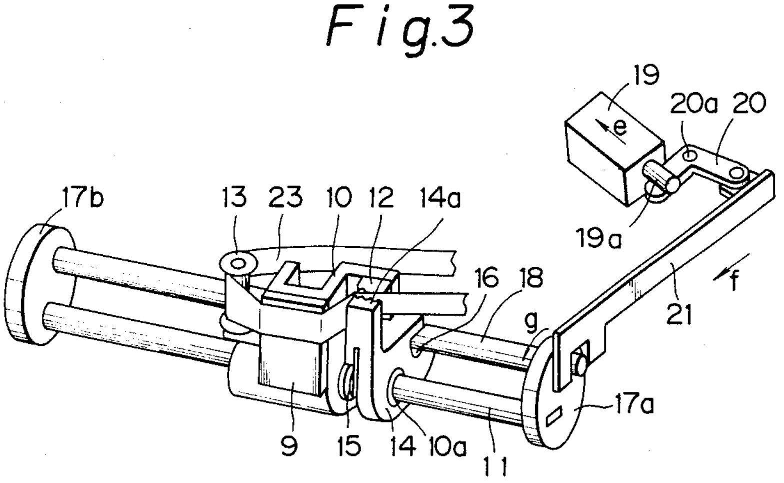
FIG. 3 is a perspective view of a carriage part shown in FIG. 2.

As shown in FIGS. 2 and 3, a multi-color printer according to the present invention includes a platen 8 and a recording head 9 such as a thermal head. The recording head 9 is carried on a carriage 10 which is slidably fitted, an a lower part thereof, in first guide shaft 11.

A ribbon clamping member 12 made of rubber and the like is mounted on an upper part on one side of the carriage 10, while a ribbon guide roller 13 is provided on the other side.

In addition, a ribbon clamping lever 14 and a spring 15 for connecting the ribbon clamping lever 14 with the carriage 10 are mounted on a bearing part 10*a* formed on one side of a lower part of the carriage 10.

The ribbon clamping lever 14 is rotatable around the above described bearing part 10*a*, and is energized by the spring 15 to permit an upper end part 14*a* thereof to make close contact with the ribbon clamping member 12.

Designated at 16 is a cutaway part providd on the ribbon clamping lever 14, and designated at 17*a* and 17*b* are side plates mounted on both end parts of the aforesaid first guide shaft 11.

Designated at 18 is a second guide shaft fixed and supported on the side plates 17*a*, 17*b* at the end parts thereof substantially in parallel to the first guide shaft 11, slidably fitted in the cutaway part 16 of the ribbon clamping lever 14.

The carriage 10 further includes on the back side thereof a moving means composed of a wire or a belt including a pulley wound thereon and others, and a space motor for reciprocating the recording head 9 and the ribbon clamping lever 14 and the like integral with the carriage 10 via the above-described moving means along the first and second guide shafts 11 and 18 (both not illustrated).

Designated at 19 is a solenoid including an L-shaped rotary member 20 having a support point 20*a* and rotatably connected in one end thereof with a shaft 19*a*. The other end of the rotary member 20 is pivotally connected with one end of an arm 21. The arm 21 includes a cutaway portion formed on the other end thereof, which is fitted over one end of the above described guide shaft 18.

In addition, designated at 22 is a ribbon cassette mounted on a printer body (not illustrated), including therein two ribbon spools 24, 25 for supplying and winding the ink ribbon 23, ribbon guides 26, 27, 28, and a ribbon stopper 29.

Further, a unidirectional rotation transmission means (not illustrated) composed of a planetary gear mechanism, etc., for transmitting turning force only in one direction is provided among the above-described ribbon spools 24, 25 and the spacing motor (not illustrated).

Upon rotating the spacing motor so as to permit the carriage 10 to be moved in the direction of an arrow "a" shown in FIG. 2, the ribbon spools 24, 25 are released due to a turning force of the spacing motor. By contrast, upon rotating the spacing motor so as to permit the carriage 10 to be moved in the opposite direction to the above-described "a" direction, the spools 24, 25 are rotated respectively in directions of arrows "b", "c" due to turning force of the motor transmitted thereto by the above-described unidirectional rotation transmission means. In addition, the above-described ribbon stopper 29 is, when the arm 21 is moved in a direction of an arrow "f" shown in FIG. 3, rotated in a direction of an arrow "d" shown in FIG. 2 while interlocking with the arm.

Figure 4:
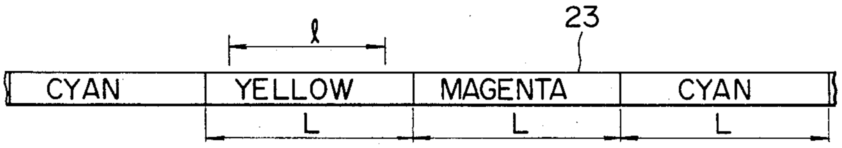
FIG. 4 is a view illustrating an exemplary ink ribbon employed in the present invention.

The ink ribbon 23 is constructed as shown in FIG. 4. In detail, the ink ribbon 23 is formed by longitudinally coating in repetition on one side surface of a continuous ribbon base material a plurality of colors of heat meltable ink such as, for example heat meltable ink having the three colors yellow, magenta and cyanogen. A coated length L of each color ink is the same as a moving region of the above-described carriage 10. "l" shown in the figure is an application range for each ink. This ink ribbon 23 wound around the above-described ribbon spool 24 has one end drawn around a ribbon guide roller 13, the front face of the recording head 9, between the ribbon clamping member 12 and the upper end part 14*a* of the ribbon clamping lever 14, and the ribbon guides 27, 28, and fixed on the ribbon spool 25. Designated at 30 is a sheet of recording paper set on the platen 8.

Operation of the multi-color printer of the present invention is as follows:

In a state before recording, the carriage 10 is positioned at an initial position "h" shown in FIG. 2, the recording head 9 is located separated from the platen 8, and the ink ribbon 23 is held between the ribbon clamping member 12 and the upper end part 14*a* of the ribbon clamping lever 14.

In such a situation, with a recording signal inputted, the solenoid 19 is driven to attract the shaft 19*a* in the direction of an arrow "e", allowing the rotary member 20 connected with the shaft 19*a* to be pivoted about the support point 20*a*. Hereby, the arm 21 is pressed to be moved in the direction "f", allowing the second guide shaft 18 to be fitted in the cutaway part thereof. By this operation, the second guide shaft 18 is rotated in the direction of an arrow "g" around the first guide shaft 11 together with the side plates 17*a*, 17*b*. Then, the second guide shaft 18 presses the ribbon clamping lever 14, whereby also the spring 15 and the carriage 10 are rotated in the same direction integrally with the ribbon clamping lever 14 around the first guide shaft 11. Thus, the recording head 9 carried on the carriage 10 makes close contact with the platen 8 via the ink ribbon 23 and the recording paper 30.

In addition, the second guide shaft 18 is moved together with the side plates 17*a*, 17*b* by further driving of the solenoid 19 to press the ribbon clamping lever 14, whereby, this ribbon clamping lever 14 is rotated around the bearing part 10*a* of the carriage 10 against force of the spring 15. This causes the upper end part 14*a* to be separated away from the ribbon clamping member 12 and thereby the ink ribbon is released from the holding force.

When the arm 21 is moved as described before in the direction of the arrow "f", interlocking with this, the ribbon stopper 29 provided on the ribbon cassette 22 is rotated in the direction of the arrow "d" to press against ink ribbon 23 for fixing the ink ribbon 23 onto the internal wall surface of the ribbon cassette 22.

Figure 1:
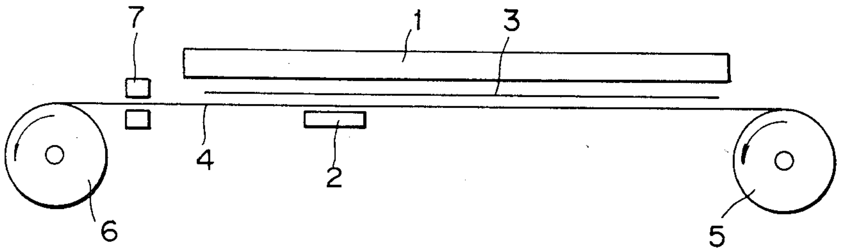
Fig. 1 (PRIOR ART)
FIG. 1 is a schematic plan view of a prior multi-color printer according to the present invention.

With this situation, the spacing motor (not shown) is rotated for transfer. In detail, when the spacing motor described above is rotated, turning force thereof is converted to linear driving force by a moving means (not shown) and transmitted to the carriage 10. Due to the transmission of this linear driving force the carriage 10 is moved in the direction of the arrow "a" shown in FIG. 1. With this movement of the carriage 10 the recording head 9 carried on this carriage 10 causes ink of the ink ribbon 23 to be transferred onto the recording paper 30 in response to information to be recorded.

At this time, the ribbon spool 24 remains free without being affected by turning force from the spacing motor, and the ink ribbon 23 remains fixed at a position of the ribbon stopper 29. Consequently, when the carriage 10 is moved as described before in the direction of the arrow "a", the ink ribbon 23 is pulled, whereby the ribbon spool 24 is rotated in the opposite direction to the arrow "b", allowing the ink ribbon 23 to be drawn out as shown by a broken line in FIG. 2.

In addition, the ink ribbon 23 has been previously positioned to permit only one-color ink to be brought about to the recording position during the time the carriage 10 moves from the initial position "h" to a turning-back position "i" shown by a broken line.

Thus, yellow ink, for example, is transferred onto the recording paper 30 by means of the recording head 9 during the time the carriage 10 is moved from the initial position "h" to the turning-back position "i" as described above.

With completion of the transfer of the yellow ink in such a way, driving of the solenoid 19 is stopped, and the shaft 19*a* is pulled back by a spring (not illustrated) in the opposite direction of the arrow "e". Accordingly, also the arm 21 is returned in the opposite direction of the arrow "f", and the second guide shaft 18 is rotated oppositely to the arrow "g" around the first guide shaft 11 together with the side plates 17*a*, 17*b*. Consequently, the ribbon clamping lever 14 is rotated around the bearing 10*a* by the restoring force of the spring 15 oppositely to its prior rotation described above to again hold the ink ribbon 23 by the upper end part 14*a* of the ribbon clamping lever and the ribbon clamping member 12. In addition, pressed by the ribbon clamping lever 14 by rotation of the second guide shaft 18, the carriage 10 is rotated integrally with this ribbon clamping lever 14, allowing the recording head 9 carried on the carriage 10 to be separated away from the platen.

Also, with return of the arm 21 oppositely to the arrow "f" as described before, the ribbon stopper 29 of the ribbon cassette 22, interlocked with the arm 21, is rotated oppositely to the arrow "d" and thereby fixation of the ink ribbon 23 by this ribbon stopper 29 is released.

Thereafter, the spacing motor is rotated oppositely to that in the above description, and thereby the carriage 10 is moved oppositely to the arrow "a" via a moving means to return to the initial position "h". With such operation of the spacing motor, the turning force of the spacing motor is transmitted to the ribbon spools 24, 25 via a unidirectional rotation transmission means (not shown), and thereby the ribbon spools 24, 25 are respectively rotated in the directions of the arrows "b", "c" for winding the ink ribbon 23. In detail, the ribbon spool 24 winds up an unemployed portion of the ink ribbon 23 ranging from the turning-back position "i" of the carriage 10 to the ribbon guide 26, while the ribbon spool 25 winds up an employed portion from the initial position "h" to the turning-back position "i", adjusting an excess and deficiency fraction of the ink ribbon by making use of idly rotation thereof with friction against the ink ribbon.

Accordingly, the ink ribbon 23 is held in a state where the next color of ink can be used for recording upon returning of the carriage 10 to the initial position "h" thereof without causing any waviness of the ink ribbon 23.

Repetition of such operations allows respective colors of ink to be transferred onto the recording paper 30, enabling color recording to be achieved.

Figure 5:
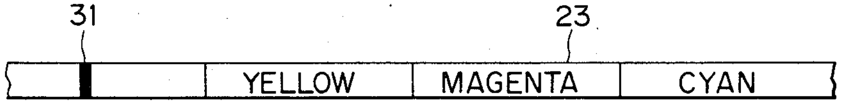
FIG. 5 is a view exemplifying another ink ribbon.

In addition, the cumulative effect of some errors upon erroneously drawing out the ink ribbon 23 during the operation described above, can be compensated for in the following way: A mark 31, for example, black-colored is provided as shown in FIG. 5 for every period of ink colors, and the carriage 10 is finely reciprocated at every period of the ink colors. This mark is read out by a sensor for setting the ink ribbon 23 to a recording position. In such a way, a head of each period can be specified, eliminating the possibility of the above-described accumulation of errors.

Figure 7I:
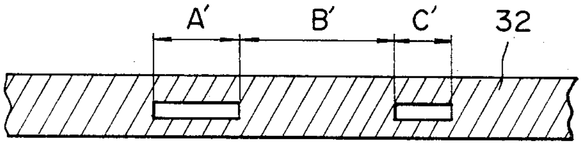
Fig. 7(I) (PRIOR ART)
FIGS. 7(I) and 7(II) are views for comparison between the present invention FIG. 7(II) and a prior art FIG. 7(I) showing an application position of an ink ribbon when recording any pieces of information at the recording positions of FIG. 6.

In addition, when it is intended to use a multi-color printer according to the present invention to record any information employing a single color ribbon, it may be employed as follows:

Namely, taking into consideration a case where regions A, C are to be recorded in a line on the recording paper 30 and an intermediate region B is not to be, a prior printer recorded by merely moving a recording head from an initial position to a turning-back position thereof while keeping it pressed onto a platen. Consequently, the ink ribbon 32 was employed, as shown in FIG. 7(I), only in portions of A′, C′ corresponding to the above-described regions A, C, and not employed in an unemployed portion B′ corresponding to the intermediate region B.

Figure 6:
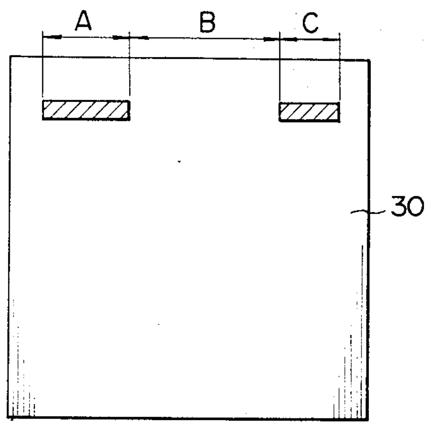
FIG. 6 is a view showing a recording position on recording paper.

However, in a multi-color printer according to the present invention, after any information is recorded on the region A, the ink ribbon 32 is held by the upper end portion 14*a* of the ribbon clamping lever 14 and the ribbon clamping member 12, and the carriage 10 is moved to the region C shown in FIG. 6.

At this time, the stopper 29 remains opened and the ink ribbon 32 has been held, so that the ink ribbon 32 is pulled out following the movement of the carriage 10. Hereby, the ribbon spools 24, 25 are rotated oppositely to the arrows "b", "c" and respectively allow the ink ribbons wound thereon to be drawn out therefrom.

Figure 7:
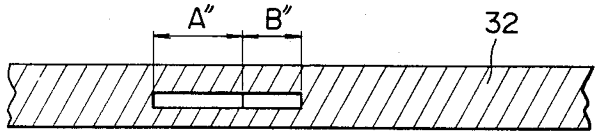

According to the operation described above, when the carriage 10 is to the region C, the ink ribbon is released from a held state thereof, and thereby the recording head 9 is allowed to make close contact with the platen 8 via the ink ribbon 32 and the recording paper 30. Thereafter, any pieces of information are recorded with movement of the carriage 10 on the region C by making use of the recording head 9. Thus, portions of the ink ribbon employed corresponding to the regions A, C in FIG. 6 become continuous portions "A", "C" as shown in FIG. 7(II) and an unemployed portion therebetween is eliminated, enabling the ink ribbon to be effectively used.

According to the present invention as described above, a multi-color printer is constructed such that the carriage including the recording head provided thereon has the ribbon clamping member, the ribbon clamping lever and the spring mounted thereon, and the spacing motor for moving said carriage whose turning force is transmitted to the two ribbon spools in the ribbon cassette mounted on the printer body via the unidirectional rotation transmission means. Thus, the multi-color printer according to the present invention provides the following effects:

The printer can wind the ink ribbon without use of a sensor for ink color detection and a motor exclusively used for the ink ribbon. Accordingly, the printer is inexpensive and facilitated to be controlled.

In addition, upon recording any information with a single color ink ribbon, a required length of the ink ribbon therefor can be limited to that required for the recording. Accordingly, the ink ribbon can be effectively used. Further, consumption of the ink ribbon can be minimized.

What is claimed is:

1. A multi-color printer, comprising:

an ink ribbon;

a longitudinally extending platen;

a guide shaft extending parallel to said platen;

a carriage mounted on said guide shaft for reciprocal longitudinal movement thereon in a first direction from an initial position to a turning-back position, and in a second direction opposite said first direction from said turning-back position to said initial position;

a recording head carried by said carriage for movement therewith in opposition to said platen, for transferring ink on said ink ribbon onto a sheet of recording paper during movement of said carriage from said initial position to said turning-back position;

an ink ribbon cassette for housing the ink ribbon, including a housing having an internal wall, first and second ribbon spools rotatably mounted in said housing for winding said ink ribbon thereon, said ink ribbon being wound on said first and second spools and having a first portion thereof extending between said first and second spools between said recording head and said platen, said carriage including means for releasably fixedly engaging said first portion of said ink ribbon to said carriage to carry said first portion of said ink ribbon therewith, and means, including a stopper mounted in said housing so as to be releasably fixedly engagable with a second portion of said ink ribbon, for pressing said second portion of said ink ribbon against said internal wall with said stopper to fix said second portion of said ink ribbon with respect to said internal wall; and means for controlling said stopper to fixedly engage said second portion of said ink ribbon and controlling one of said first and second spools to rotate, when said carriage is moved longitudinally while released from said first portion of said ink ribbon, and for controlling said stopper to release from said second portion of said ink ribbon and controlling both of said first and second spools to rotate, when said carriage is moved longitudinally while fixedly engaged with said first portion of said ink ribbon.

2. A multi-color printer as in claim 1, wherein said controlling means comprises means for controlling said stopper to fixedly engage said second portion of said ink ribbon and controlling one of said first and second spools to rotate such that said ink ribbon is drawn out of said one of said first and second spools as said carriage moves in said first direction from said initial position to said turn-back position with said carriage released from said ink ribbon, and for controlling said stopper to release from said second portion of said ink ribbon and controlling both of said first and second spools to rotate such that the drawn out portion of said ink ribbon is wound thereon, as said carriage moves in said second direction from said turn-back position to said initial position with said carriage fixedly engaged with said first portion of said ink ribbon.

3. A multi-color printer as in claim 1, wherein said means for fixedly engaging said first portion of said ink ribbon includes a ribbon clamping member and a pivotable ribbon clamping member on opposite sides of said first portion of said ink ribbon, and a spring connecting said ribbon clamping member and said ribbon clamping lever so as to bias said ribbon clamping lever toward said ribbon clamping member so as to clamp said first portion of said ink ribbon therebetween.

4. A multi-color printer as in claim 3, wherein said guide shaft includes first and second parallel guide shaft members slidably supporting said carriage, said ribbon clamping member being fixed with respect to said recording head, said second guide shaft being rotatable about said first guide shaft so as to rotate said ribbon clamping lever against the bias of said spring and thereby release said first portion of said ink ribbon for longitudinal movement relative to said carriage.

5. A multi-color printer as in claim 1, wherein said guide shaft includes first and second parallel guide shaft members slidably supporting said carriage, said second guide shaft member being rotatable about said first guide shaft member so as to rotate said carriage and release said first portion of said ink ribbon from said means for fixedly engaging said first portion of said ink ribbon.

6. A multi-color printer as in claim 1, wherein said first portion of said ink ribbon is released from fixed engagement with said carriage during transfer of the ink from said ink ribbon onto the recording paper.

7. A multi-color printer according to claim 1 wherein when the carriage moves to the turning-back position thereof while holding the ink ribbon, the ink ribbon is drawn out from the two ribbon spools.

8. A multi-color printer according to claim 1 wherein said ink ribbon is longitudinally coated in succession with heat meltable ink having a plurality of colors, and the continuous length of said ink ribbon coated with each color being equal to the range of movement of said carriage between said initial position and said turning-back position.

9. A multi-color printer according to claim 1 wherein said ink ribbon is coated with heat meltable ink having a single color.

* * * * *